United States Patent
Wilson et al.

(10) Patent No.: US 7,883,043 B2
(45) Date of Patent: Feb. 8, 2011

(54) SENSITIVITY ADJUSTMENT FOR ELECTRONIC BITE ALERT FOR A FISHING REEL

(75) Inventors: Robert R. Wilson, Broken Arrow, OK (US); M. Scott Smith, Broken Arrow, OK (US); Robert Bagby, Tulsa, OK (US); Chris Flory, Tulsa, OK (US); Joshua Buck, Corpus Christi, TX (US); Tony Wei, Jiangsu (CN)

(73) Assignee: W.C. Bradley/Zebco Holdings, Inc., Tulsa, OK (US)

( * ) Notice: Subject to any disclaimer, the term of this patent is extended or adjusted under 35 U.S.C. 154(b) by 87 days.

(21) Appl. No.: 12/141,401

(22) Filed: Jun. 18, 2008

(65) Prior Publication Data

US 2009/0313876 A1 Dec. 24, 2009

(51) Int. Cl.
*A01K 89/00* (2006.01)
*A01K 97/12* (2006.01)
(52) U.S. Cl. .................. 242/305; 242/307; 242/323; 43/17
(58) Field of Classification Search ......... 242/305–308, 242/223, 224, 323; 43/16, 17, 4.5, 44.95, 43/24
See application file for complete search history.

(56) References Cited

U.S. PATENT DOCUMENTS

| | | | | |
|---|---|---|---|---|
| 3,275,260 A | * | 9/1966 | Woollen | 242/305 |
| 4,087,058 A | * | 5/1978 | Yamasaki et al. | 242/300 |
| 4,548,367 A | * | 10/1985 | Councilman | 242/306 |
| 4,695,009 A | * | 9/1987 | Swisher | 242/307 |
| 5,199,665 A | * | 4/1993 | Tipton | 242/305 |
| 5,555,667 A | * | 9/1996 | Bae et al. | 43/17 |
| 5,782,033 A | * | 7/1998 | Park et al. | 43/4 |
| 5,867,931 A | * | 2/1999 | Morris et al. | 43/17 |
| 6,035,573 A | * | 3/2000 | Flores | 43/17 |
| 6,253,483 B1 | * | 7/2001 | Reams | 43/17 |
| 6,581,864 B1 | | 6/2003 | Littau | |
| 7,008,086 B1 | * | 3/2006 | Kell | 362/431 |
| 7,225,102 B2 | | 5/2007 | Stiner et al. | |
| 7,364,105 B1 | * | 4/2008 | Yeh | 242/305 |
| 2004/0056131 A1 | * | 3/2004 | Stiner et al. | 242/223 |
| 2004/0124297 A1 | * | 7/2004 | Steer | 242/223 |
| 2008/0035775 A1 | * | 2/2008 | Hoag et al. | 242/305 |

* cited by examiner

*Primary Examiner*—Evan H Langdon
(74) *Attorney, Agent, or Firm*—Fellers, Snider, Blankenship, Bailey & Tippens, P.C.

(57) ABSTRACT

A fishing reel, such as a spincast reel or a spinning reel, has a clutch assembly mounted on a shaft adjacent to the rotating component, the clutch assembly for frictional engagement with a rotating component. The clutch assembly has a first and a second protuberance. A bite alert contact is located for engagement with the first protuberance. A calibration member is adjacent the clutch assembly for engagement with the second protuberance. The calibration member provides a selectable amount of resistance to rotation of the clutch assembly, thereby regulating an amount of rotational force required to activate the bite alert contact. The fishing reel may further include a sensitivity switch for adjusting the selectable amount of resistance provided by the calibration member, which may adjust the resistance in discrete amounts.

9 Claims, 10 Drawing Sheets

SENSITIVITY ADJUSTMENT FOR ELECTRONIC BITE ALERT FOR A FISHING REEL

FIELD OF THE INVENTION

This invention relates to bite alerts on fishing reels, and more particularly, relates to an electronic bite alert having a sensitivity adjustment.

BACKGROUND OF THE INVENTION

Fishing reels having electronic bite alert features are known. An example of an existing reel having an electronic bite alert is commonly owned U.S. Pat. No. 7,225,102 for Reel Mechanism with Watertight Electronic Module to Stiner et al. Electronic bite alert mechanisms may be provided in various reel types including spincast reels and spinning reels. In a spincast fishing reel, the spool typically does not rotate, although in some reels the spool may rotate as part of the drag system. For non-rotating spincast fishing reels, winding and unwinding are controlled by the spinner head. When tension is applied to the fishing line such as might occur via a fish strike, reverse rotation of the spinner head is prevented by an anti-reverse mechanism to further prevent unwinding of the fishing line. Thus, tension applies torque to the spool, thereby urging rotation of the spool. Such rotation, however, is prevented in Stiner et al. by the interaction of a boss working in conjunction with a stop. The force applied by the boss on the stop is proportional to tension on the fishing line, thereby allowing measurement of such tension with the load cell. Further, the force applied on the stop may be used to activate a bite alert.

SUMMARY OF THE INVENTION

A sensitivity adjustment for an electronic bite alert in a fishing reel allows adjustability in the amount of force required to activate the electronic bite alert. Permitting adjustability of the activation force allows the reel to be effective when used in a variety of fishing environments, i.e., adjustability allows a user to offset outside forces on the fishing line. By offsetting outside forces on the fishing line, the sensitivity or calibration adjustment allows the person fishing to have more accurate bite alerts. Examples of outside forces that the sensitivity adjustment can compensate for include water current pulling on the bait, the weight of suspended bait, or wind moving the line.

The invention allows a user of a fishing reel, e.g., a spincast reel, to activate an electronic bite alert off of the anti-reverse system of the reel. An example of an anti-reverse system is disclosed in U.S. Pat. No. 5,199,665, which is hereby incorporated by reference. One way to implement a sensitivity adjustment uses a force sensor on the anti-reverse system and electronically controls the force required to activate the electronics. A disadvantage of this design is relatively high cost. Another way to add a sensitivity adjustment is to use an adjustable spring force that acts on the anti-reverse system in an opposite direction than the direction that the line tension acts on the anti-reverse system. A screw adjustment may be used to adjust the spring force. Alternatively, an adjustment lever with a cam may be used wherein the cam acts on a spring that acts on a link that, in turn, acts against the anti-reverse system.

In one embodiment, line tension rotates a spinner head, which rotates a gear system. The gear system rotates a clutch. A clutch outer ring is provided with a protuberance that closes contacts for signaling the bite alert. A calibration slider is used to apply spring force to the clutch outer ring in an opposite direction than force resulting from line tension. For purposes of this application, the term "calibration force" refers to the spring force applied to the clutch outer ring by the calibration slider. Calibration force may be adjusted by the user to compensate for external forces on the line tension. The user adjustment may be controlled through a sensitivity switch. The calibration force applied through the sensitivity switch adjusts the sensitivity of the bite alert. The higher the calibration force, the lower the sensitivity. Zero calibration force is maximum sensitivity.

Preferably, the sensitivity switch has a cam member that selectively engages the sensitivity spring. By adjusting the orientation of the sensitivity switch, the cam member exerts a force on the calibration spring. The calibration spring applies a spring force to the calibration slider.

In another embodiment, a camming surface may be used that allows an infinitely gradable adjustment of the spring force as opposed to a stepped adjustment of the spring force.

DETAILED DESCRIPTION OF THE PREFERRED EMBODIMENTS

Figure 1A:
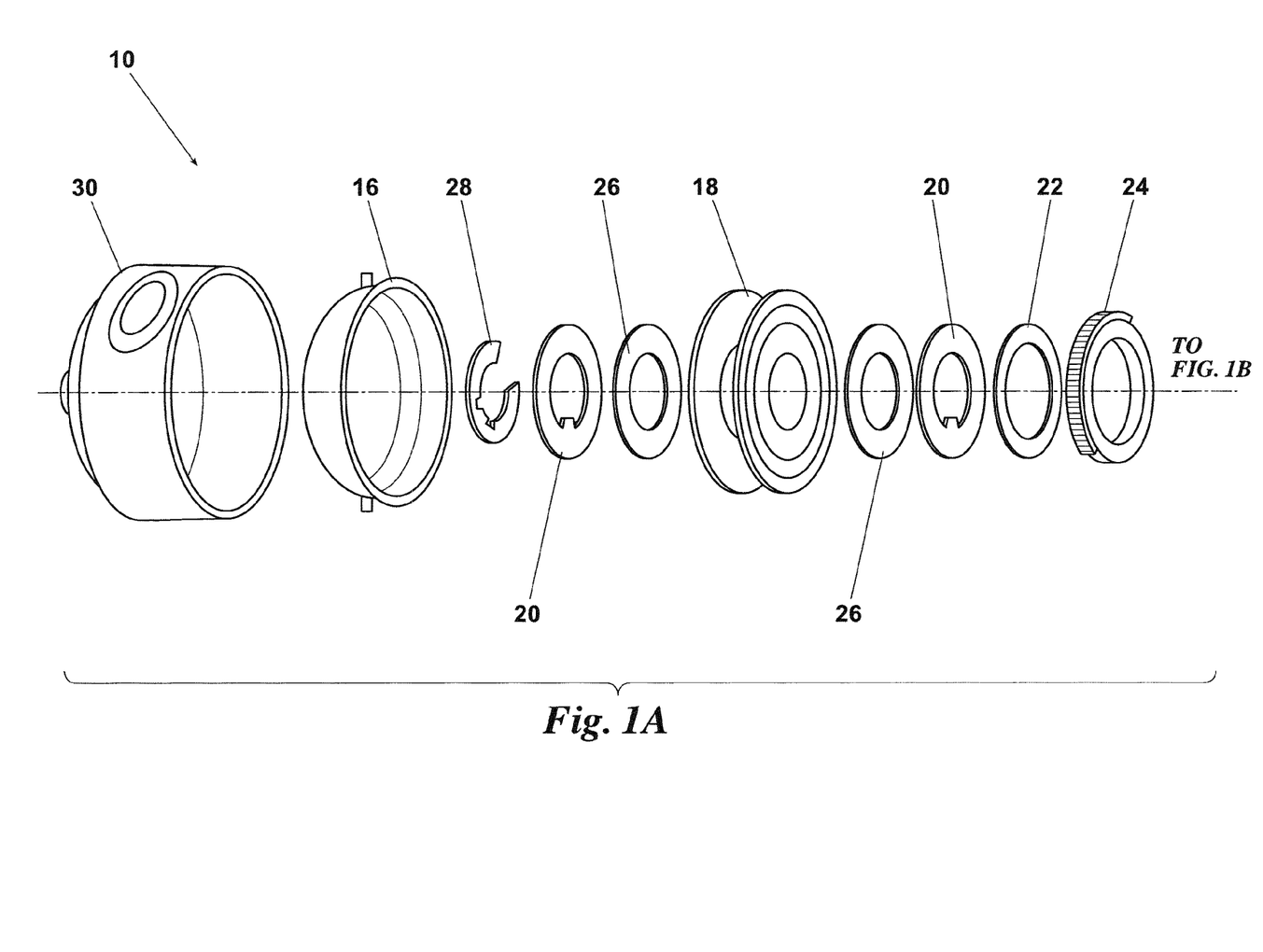
FIG. 1 is an exploded perspective view of a spincast reel utilizing the bite alert sensitivity adjustment of the invention.
Figure 1B:
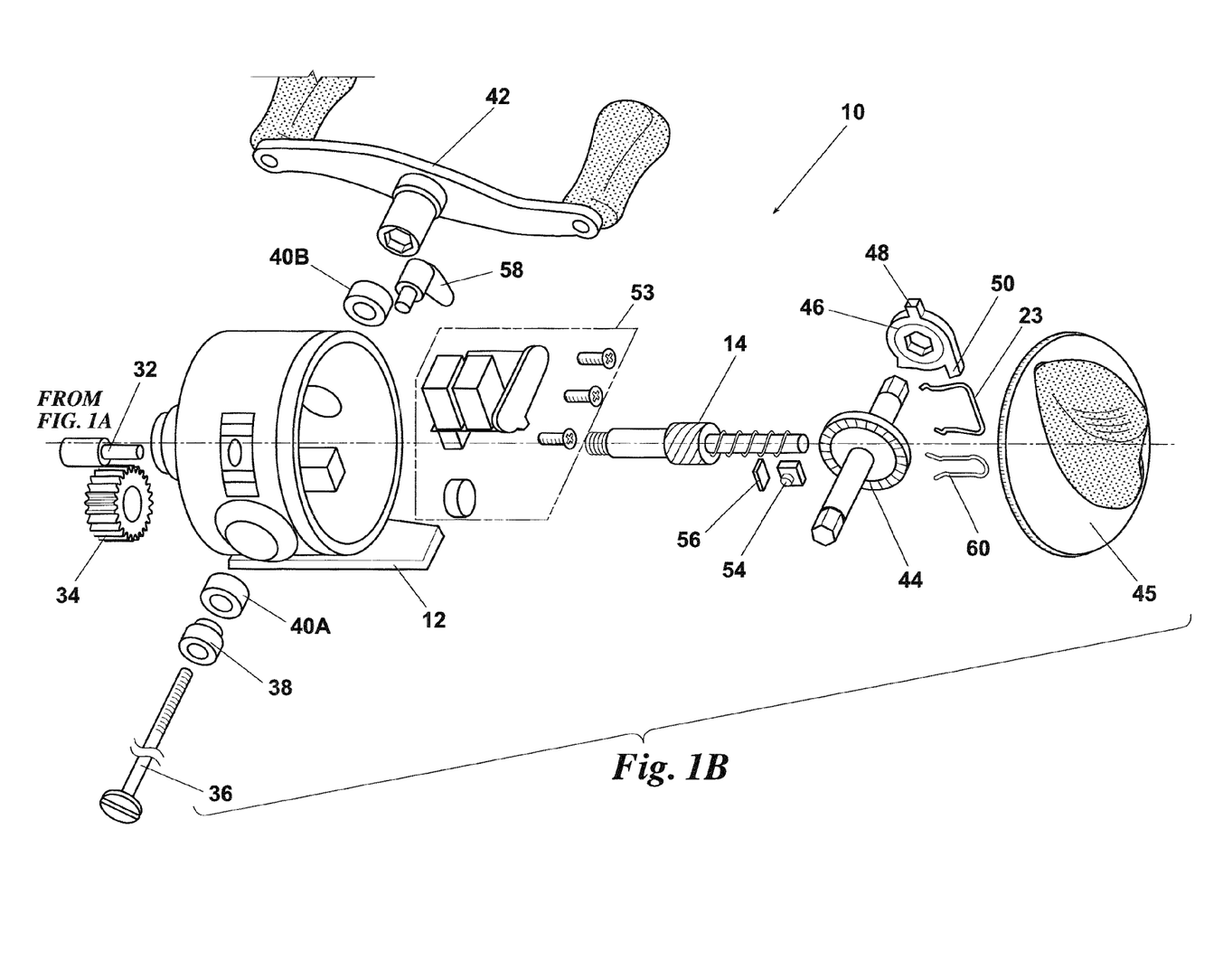

Referring first to FIG. 1, an exploded view of spincast reel 10 is shown. Spincast reel 10 includes a body assembly 12. A center shaft assembly 14 passes through body assembly 12. A spinner head assembly 16 is located forward of the body assembly 12. Spinner head assembly 16 is provided with a pickup mechanism. Spinner head assembly 16 is mounted on center shaft assembly 14. A spool assembly 18 is rotatably mounted on center shaft assembly 14 between spinner head assembly 16 and body assembly 12.

Also surrounding center shaft assembly 14 between spool assembly 18 and body assembly 12 are various washers, including keyed drag washer 20, spring washer 22 and drag cam plate 24. Located between spool assembly 18 and spinner head assembly 16 is drag washer 26 and keyed drag washer 20. An e-clip 28 is received on an end of center shaft assembly 14. The spinner head assembly 16 and spool assembly 18 are enclosed within front cover assembly 30. Mounted on a front side of body assembly 12 is drag adjustment pinion 32, which engages drag cam plate 24. Drag adjustment pinion 32 may be rotated by a user via drag wheel 34.

Crank rod 36 is transversely mounted in body assembly 12. On a first side of body assembly 12, crank rod 36 passes through crank rod spacer 38 and bushing 40a. On a second side of body assembly 12, crank rod 36 passes through bushing 40b and into handle assembly 42. A drive gear 44 is mounted on crank rod 36 for engaging a pinion gear that is mounted on center shaft assembly 14. Drive gear 44 and related components are enclosed within back cover assembly 45.

Figure 2:
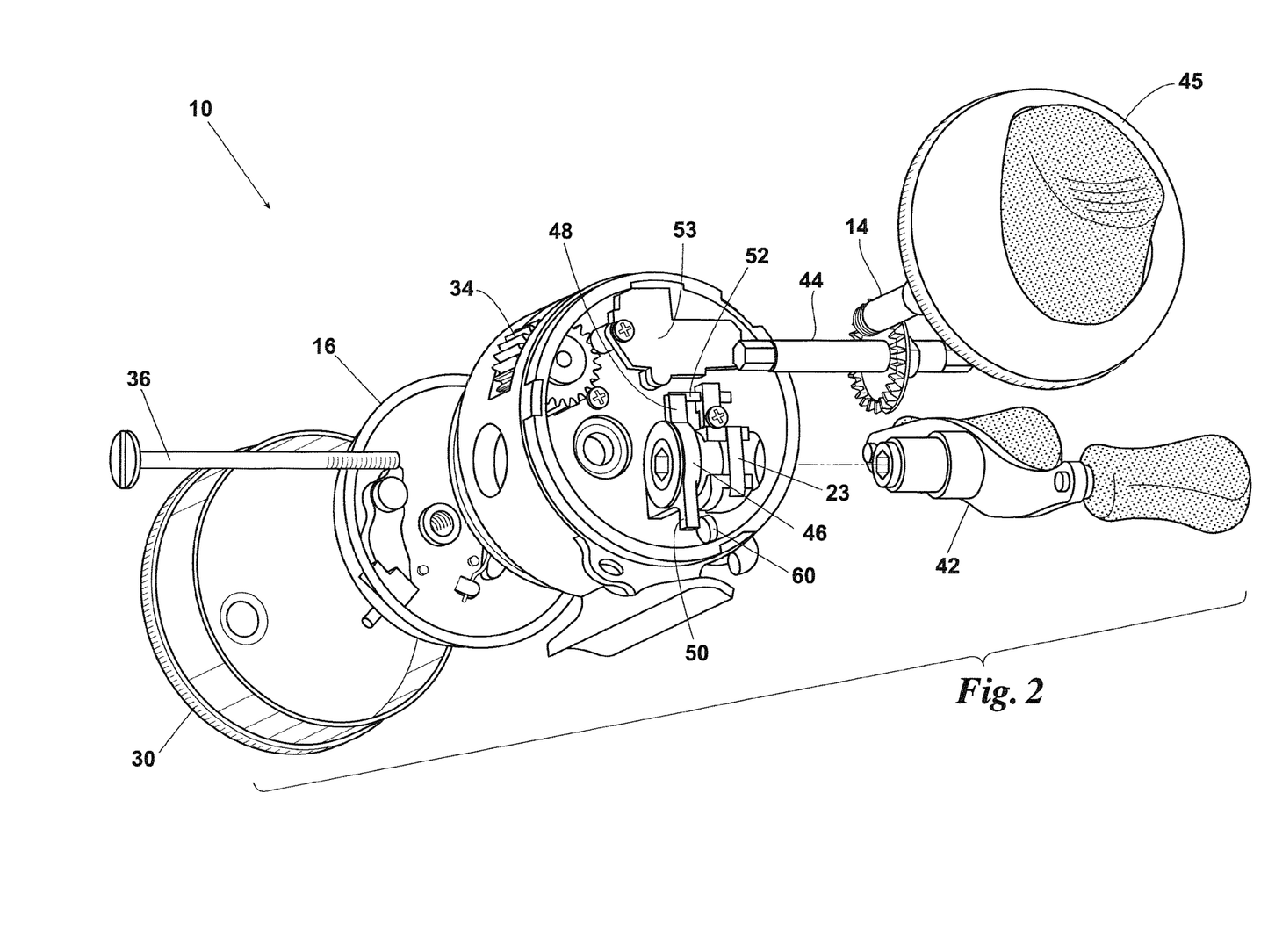
FIG. 2 is a partially exploded perspective view showing the spincast reel of FIG. 1.

A clutch assembly 46 is mounted on crank rod 36 adjacent to drive gear 44. Clutch assembly 46 is provided with a first radial protrusion 48 and a second radial protrusion 50. Bite alert contact 52 (FIG. 2) is proximate an outer surface of clutch assembly 46 for selective engagement with first radial protrusion 48. Bite alert contact 52 communicates with electronics in module assembly 53.

Figure 3:
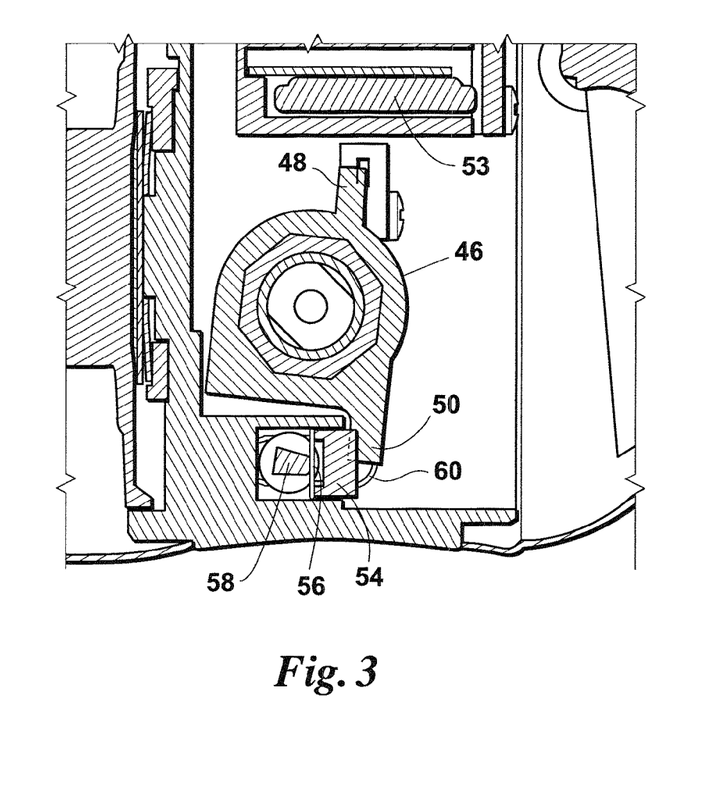
FIG. 3 is a partial cross of the reel of FIG. 1 taken along line A-A of FIG. 2.

Calibration slider 54 (FIGS. 1, 3, 4) is proximate to an outer surface of clutch assembly 46. Calibration slider 54 has a first end for engagement with second radial protrusion 50. A sensitivity spring 56 is provided on a second end of calibration slider 54 for providing a spring force or calibration force to second radial protrusion 50 via calibration slider 54 in an opposite direction from force provided by tension from fishing line.

A sensitivity switch 58 extends from body assembly 12 and is accessible by a user. Sensitivity switch 58 has a stem with a portion having a non circular, e.g., square, cross section. The square portion is received within sensitivity switch retainer 60 (FIGS. 1, 5). Switch retainer 60 biases sensitivity switch 58 into one of several discrete positions, i.e., positions wherein the upper and lower surfaces of the square portion are parallel to legs of the sensitivity switch retainer 60. In a preferred embodiment, sensitivity switch 58 is adjustable to two positions. Sensitivity switch 58 further has a section defining a lobe with a camming surface (see FIGS. 3 and 4) for adjusting the sensitivity of the bite alert.

When the calibration force, i.e., spring force, is high, the bite alert is then set for low sensitivity. When the calibration force is set at zero, the bite alert is set for maximum sensitivity. For example, in an engaged position, shown in FIG. 3, the camming surface of sensitivity switch 58 engages sensitivity spring 56. When a rotational force is applied to clutch assembly 46 by fishing line, clutch assembly 46 is biased to rotate in a clockwise direction in FIGS. 3 and 4. Rotation is resisted by second radial protuberance 50, which abuts calibration slider 54. Before clutch assembly 46 may be rotated, sensitivity spring 56 must be compressed.

Figure 4:
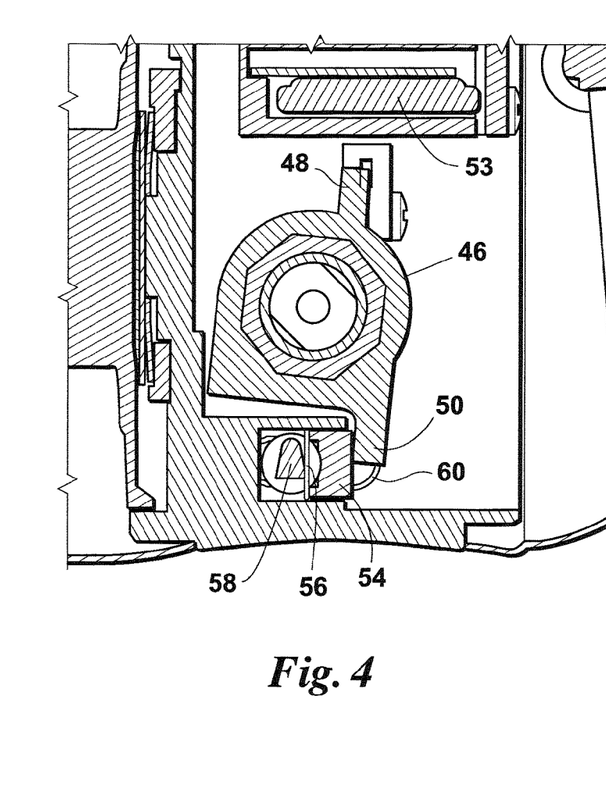
FIG. 4 is a partial cross of the reel of FIG. 1 taken along line A-A of FIG. 2.
Figure 5:
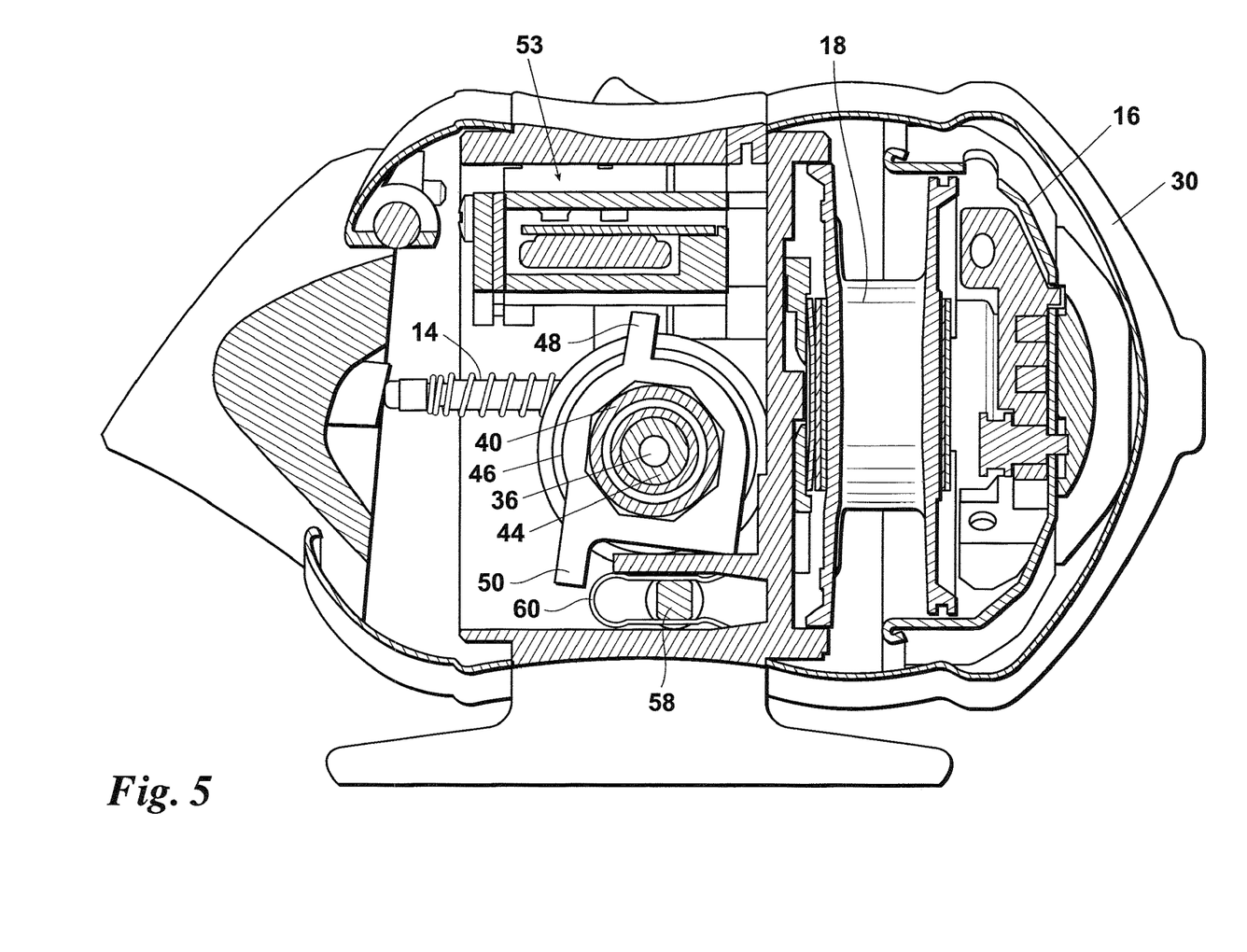
FIG. 5 is a cross-sectional view of the reel of FIG. 1 taken along line 5-5 of FIG. 1.
Figure 6:
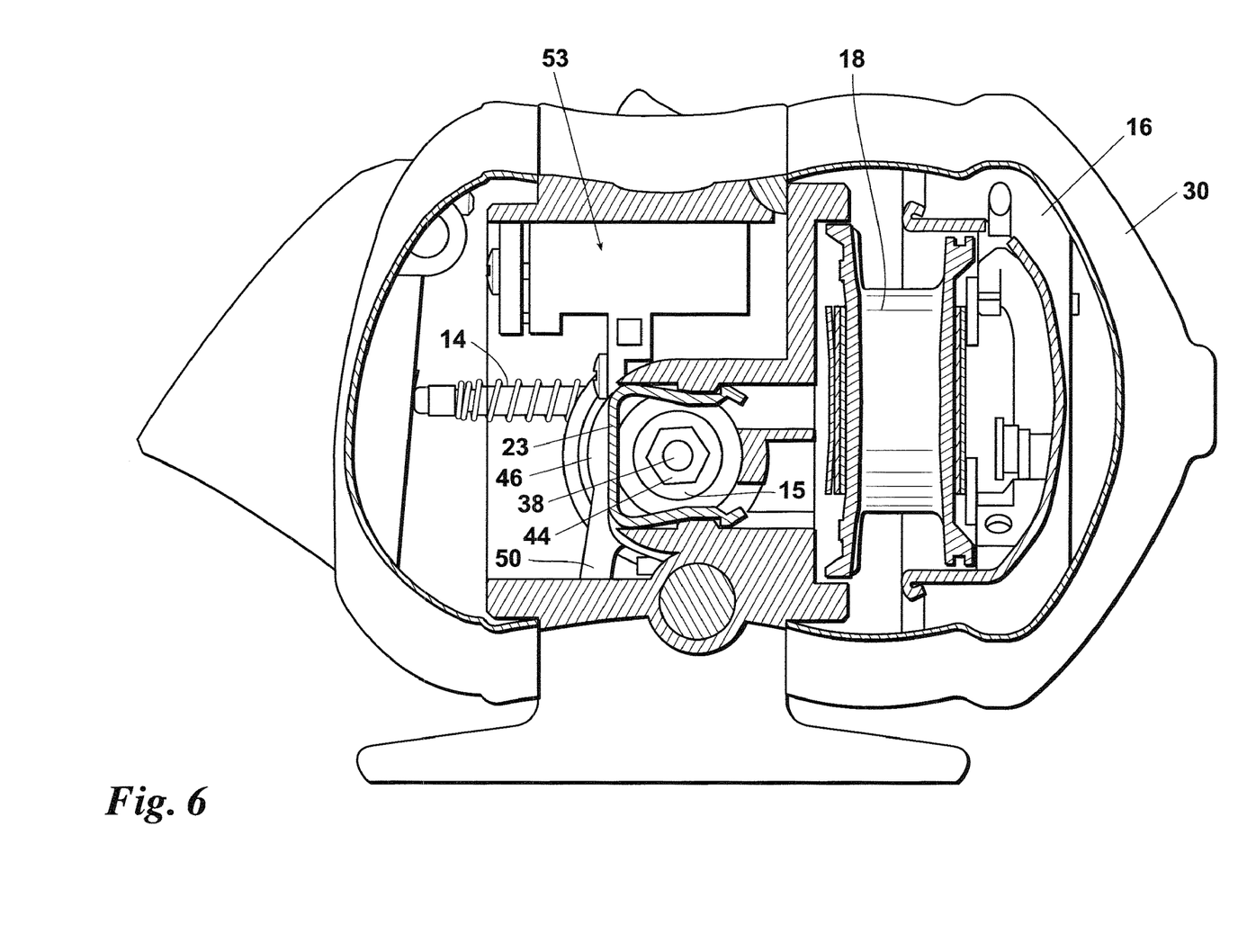
FIG. 6 is a cross-sectional view of the reel of FIG. 1 taken along line 6-6 of FIG. 1.
Figure 7:
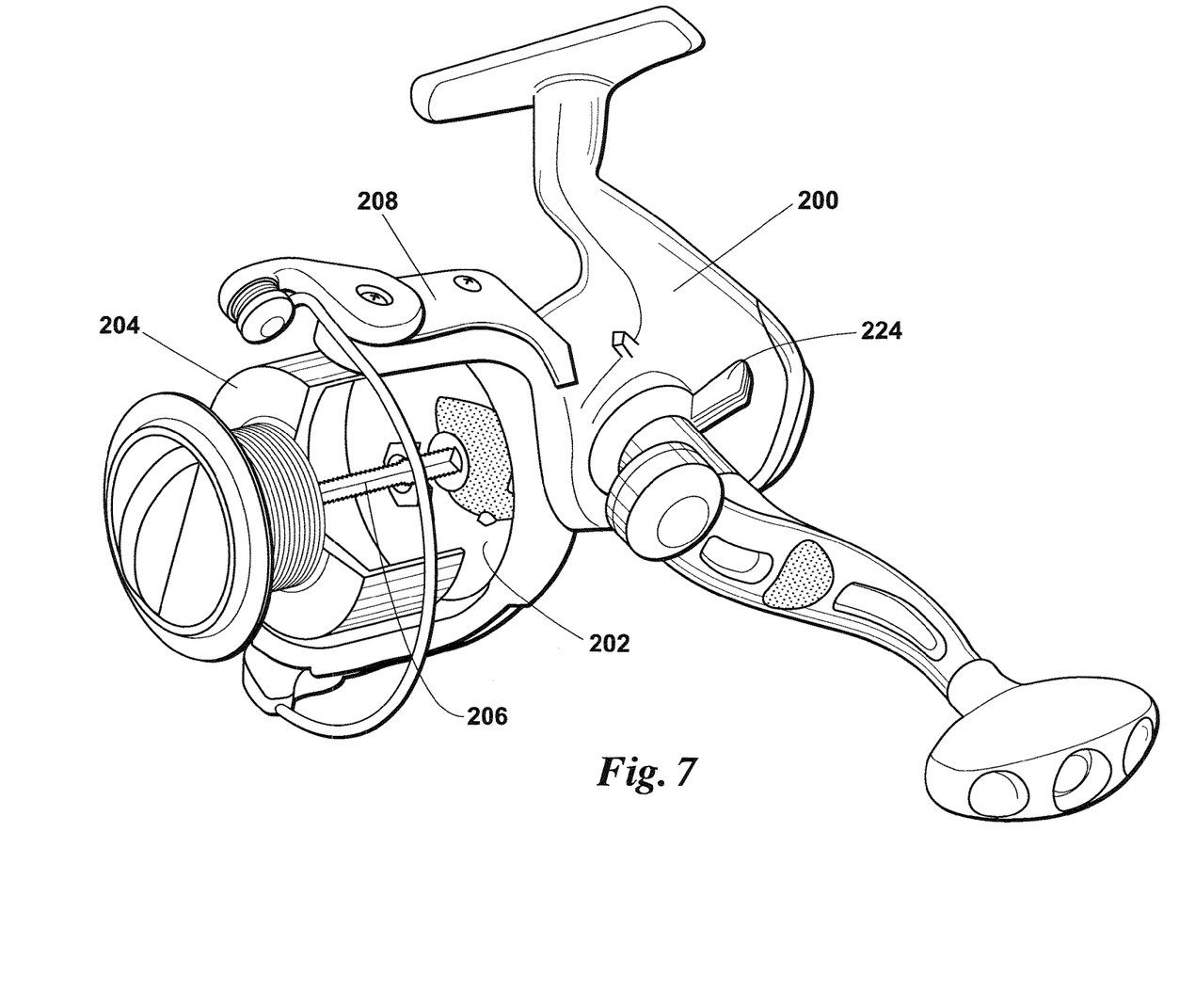
FIG. 7 is a perspective view of a spinning reel.

In an unengaged position, or zero calibration force configuration, shown in FIG. 4, rotation of clutch assembly 46 is resisted only by calibration slider 54. Therefore, when sensitivity switch 58 is rotated to the unengaged position shown in FIG. 4, the bite alert is easily triggered by contact of protuberance 48 with bite alert contacts 100.

Referring now to FIGS. 7-10, a second embodiment of the invention is shown in the context of a spinning reel. The spinning reel includes a body 200 defining a forwardly oriented face 202. A spool 204 (FIG. 7) is affixed to body 200 and mounted on axle 206. Axle 206 extends forwardly from face 202. A rotor assembly 208 is rotatably affixed to body 200.

Figure 8:
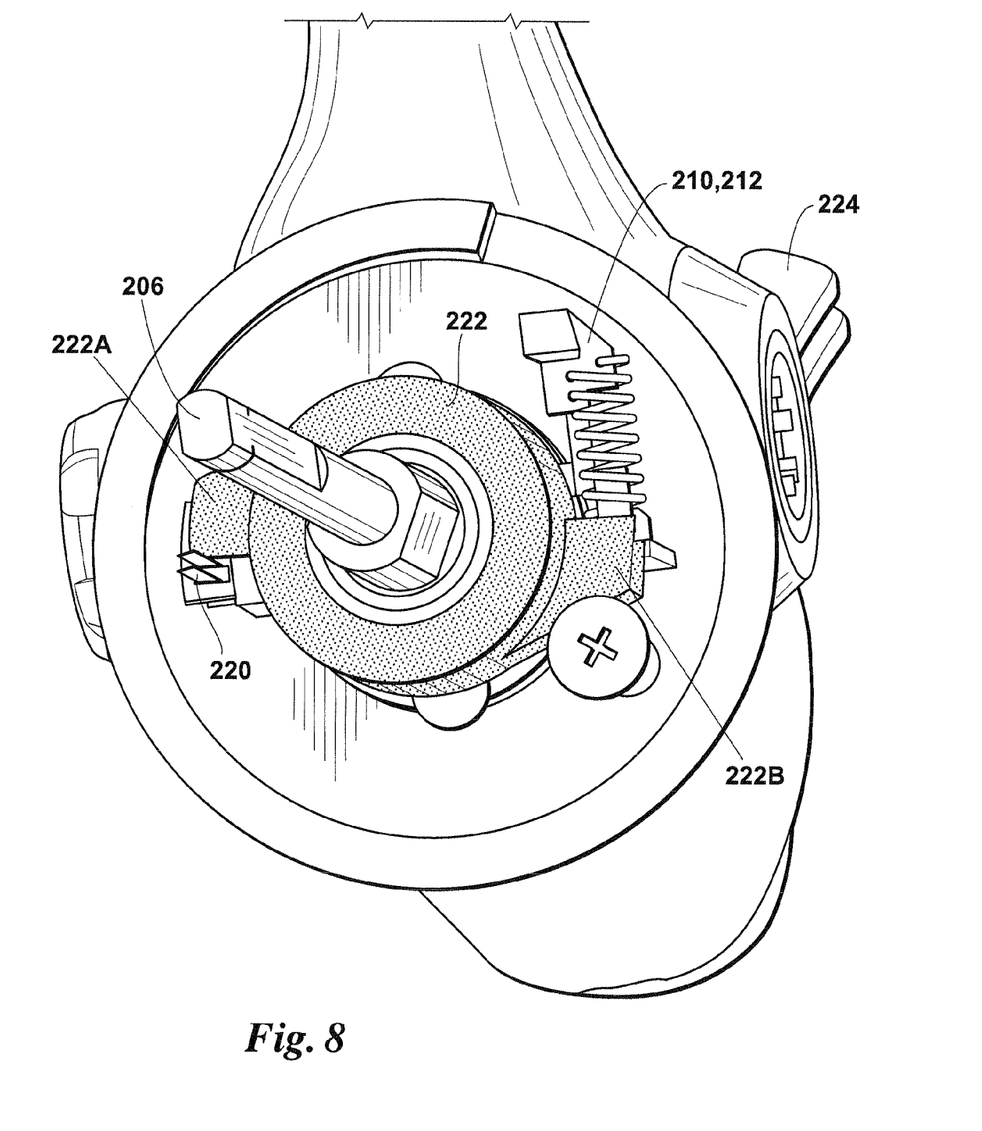
FIG. 8 is an enlarged perspective view of the face of the spinning reel of FIG. 7 showing components of a second embodiment of a sensitivity adjustment mechanism.
Figure 9:
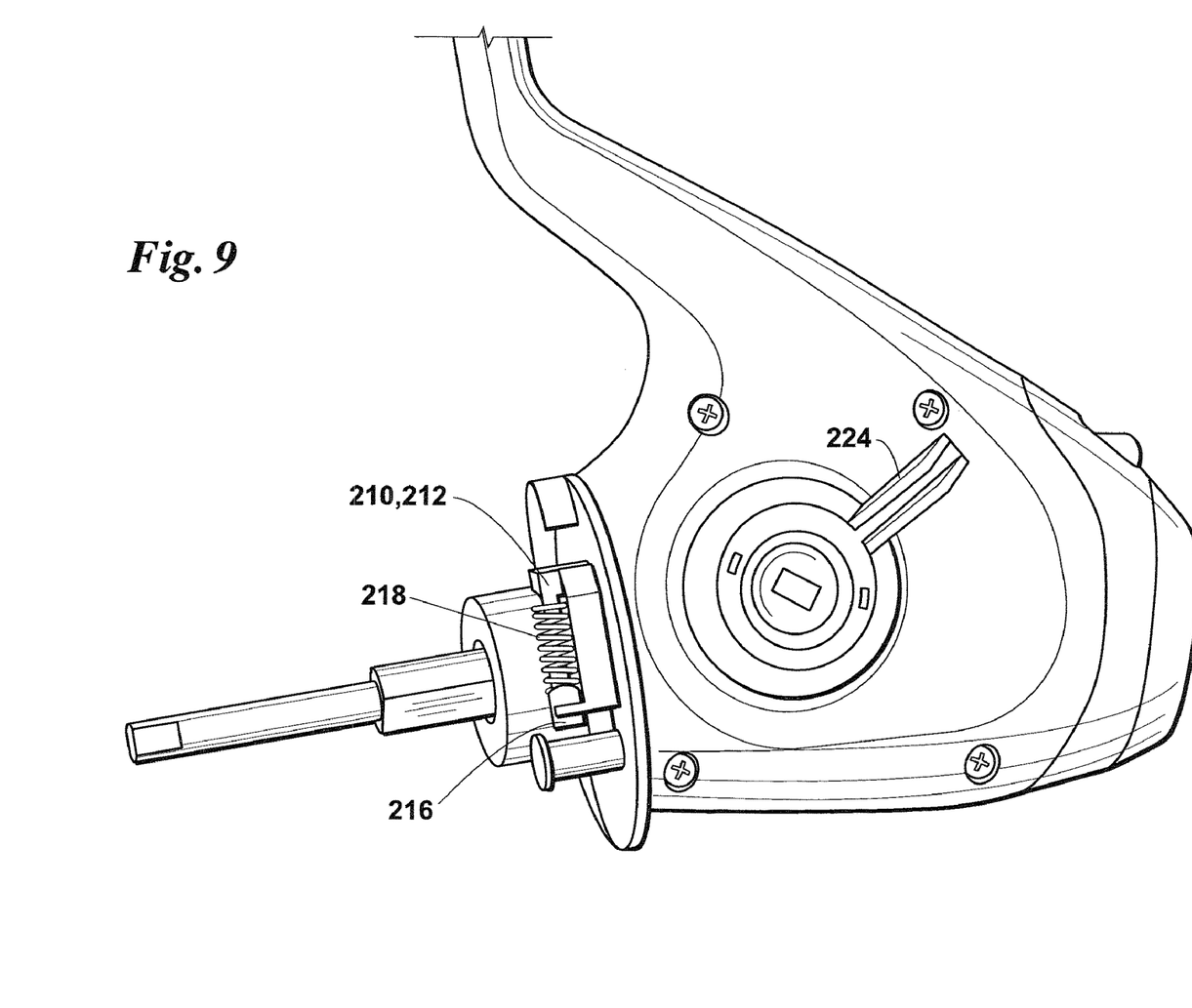
FIG. 9 is a perspective view of the spring reel of FIG. 7, shown partially disassembled.

Calibration arm 210 extends through face 202. Calibration arm 210 has a forward portion 212 that extends forward of face 202 in a rearward portion 214 that extends rearward of face 202. A calibration slider 216 is biased away from forward portion 212 of calibration arm 210 by calibration spring 218.

Also extending forwardly from face 202 is a pair of bite alert contacts 220 (FIG. 8). A clutch outer ring 222 surrounds axle 206. Clutch outer ring 222 defines a first protuberance 222a and a second protuberance 222b. First protuberance 222a is positioned adjacent bite alert contacts 220. Second protuberance 222b is positioned adjacent to calibration slider 216.

A calibration lever 224 is rotatably mounted to body 200. Calibration lever cam 226 (FIG. 10) is movably connected to calibration lever 224 so that calibration lever cam 226 is moved by calibration lever 224. Calibration lever cam 226 selectively applies force to rearward portion 214 of calibration arm 210.

Figure 10:
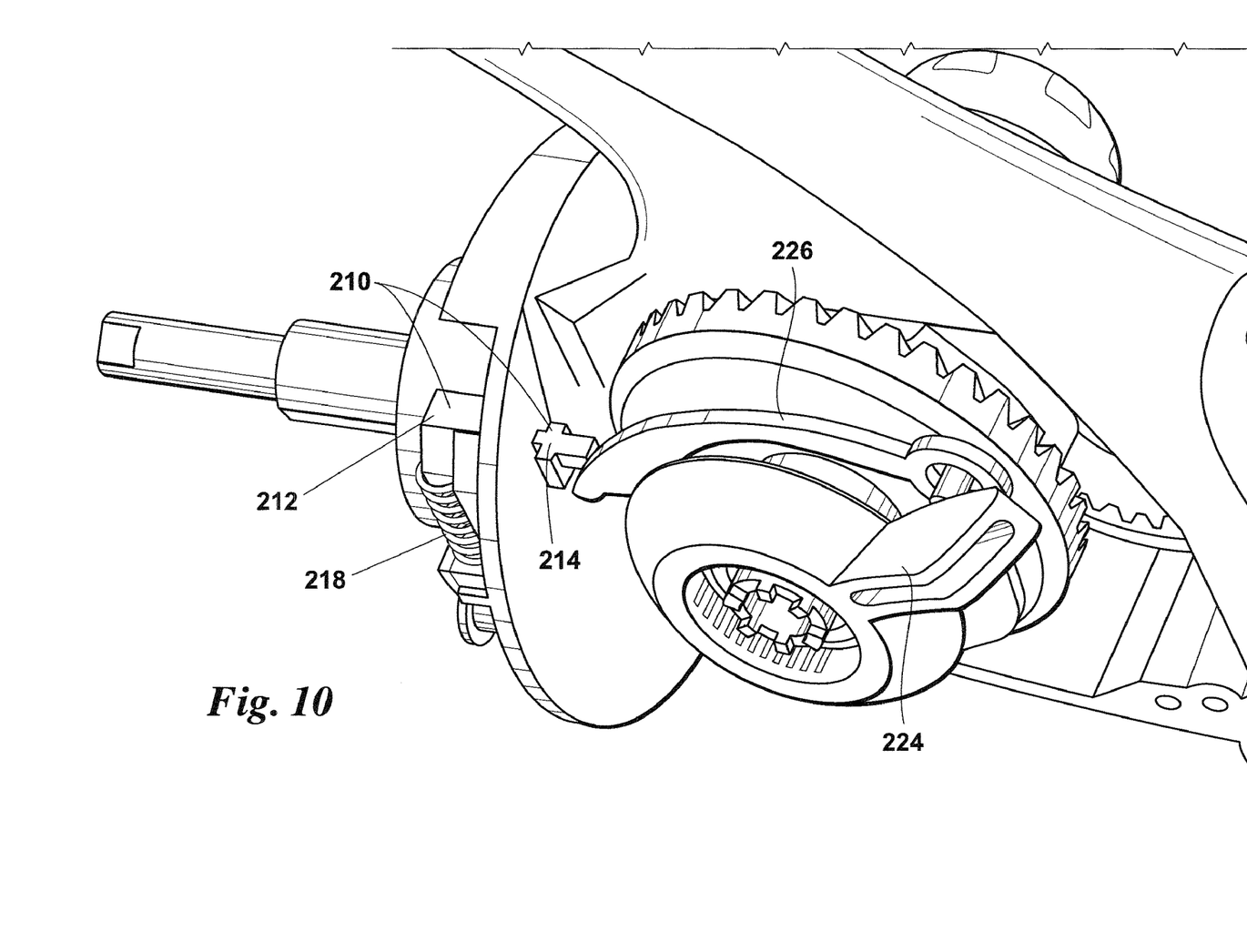
FIG. 10 is a perspective view of the spring reel of FIG. 7, shown partially disassembled.

In practice, when calibration lever 224 is rotated counterclockwise, calibration lever cam 226 is partially or substantially disengaged from rearward portion 214 of calibration arm 210. As a result, calibration spring 218 is relatively compressed. In the compressed configuration, calibration spring 218 provides maximum resistance against second protuberance 222b, thereby providing maximum resistance to rotation of clutch outer ring 222 and maximum resistance of movement of first protuberance 222a, which acts to close bite alert contacts 220.

When calibration lever 224 is rotated in a clockwise direction, calibration lever 224 rotates calibration lever cam 226 such that calibration lever cam 226 provides an upward force against rearward portion 214 of calibration arm 210. When calibration arm 210 is forced upwardly, calibration spring 218 is decompressed, thereby lowering the resistance provided by calibration slider 216 against second protuberance 222b. Therefore, calibration spring 218 provides less resistance to rotation of clutch outer ring 222 and consequently less resistance to movement of first protuberance 222a, which results in less resistance to closure of bite alert contacts 220.

Therefore, it can be seen that by adjusting the sensitivity level, e.g., via sensitivity switch 58 or calibration lever 224, a bite alert in a fishing reel may be adjusted to be more or less sensitive to line tension per the desire of the user and in response to environmental conditions.

Thus, the present invention is well adapted to carry out the objectives and attain the ends and advantages mentioned above as well as those inherent therein. While presently preferred embodiments have been described for purposes of this disclosure, numerous changes and modifications will be apparent to those of ordinary skill in the art. Such changes and modifications are encompassed within the spirit of this invention as defined by the claims.

What is claimed is:

1. A fishing reel comprising:
   a body assembly;
   drive mechanism including a shaft;
   a rotating component mounted on said shaft;
   a clutch assembly mounted on said shaft adjacent to said rotating component, said clutch assembly for frictional engagement with said rotating component, said clutch assembly having a first protuberance and a second protuberance;
   a bite alert contact adjacent said clutch assembly for engagement with said first protuberance;
   a calibration member adjacent said clutch assembly for engagement with said second protuberance;
   wherein said calibration member provides a selectable amount of resistance to rotation of said clutch assembly, thereby regulating an amount of rotational force required to activate said bite alert contact;
   said calibration member has a first end for engaging said second protuberance of said clutch assembly, said calibration member has a second end upon which is mounted a sensitivity spring; and further comprising a sensitivity switch accessible by a user for selectively engaging said sensitivity spring for altering a resistance to rotation of said clutch assembly by said calibration member.

2. The fishing reel according to claim 1 wherein:

said sensitivity switch may be set to engage or not to engage said sensitivity spring.

3. The fishing reel according to claim 1 wherein:

said sensitivity switch engages a sensitivity switch retainer that forces said switch into one of a first and a second position.

4. A fishing reel comprising:

a body assembly;

a center shaft assembly passing through said body assembly;

a spinner head assembly mounted on said center shaft assembly forward of said body assembly;

a spool assembly rotatably mounted on said center shaft assembly between said spinner head assembly and said body assembly;

a crank rod transversely mounted in said body assembly;

a drive gear mounted on said crank rod for engaging a pinion gear that is mounted on said center shaft assembly;

a clutch assembly mounted on crank rod adjacent to and in frictional contact with said drive gear, said clutch assembly provided with a first radial protrusion and a second radial protrusion;

a bite alert contact proximate an outer surface of said clutch assembly for selective engagement with said first radial protrusion;

a calibration slider proximate to an outer surface of clutch assembly, said calibration slider having a first end for engagement with said second radial protrusion;

a sensitivity spring provided on a second end of said calibration slider for providing a calibration force to said second radial protrusion via said calibration slider in an opposite direction from force provided by tension from a fishing line;

a sensitivity switch extending from said body assembly and accessible by a user, said sensitivity switch having a stem with a portion having a non-circular cross section, said non-circular portion received within said sensitivity switch retainer, said switch retainer biasing said sensitivity switch into one of several discrete positions, said sensitivity switch further having a section defining a lobe with a camming surface for adjusting the sensitivity of the bite alert.

5. The fishing reel according to claim 4 wherein:

said sensitivity switch may be set to engage or not to engage said sensitivity spring.

6. The fishing reel according to claim 4 wherein:

said sensitivity switch engages a sensitivity switch retainer that forces said switch into one of a first and a second position.

7. An adjustable sensitivity bite alert for a fishing reel comprising:

a clutch assembly mounted on a shaft adjacent to a rotating component, said clutch assembly for frictional engagement with said rotating component, said clutch assembly having a first protuberance and a second protuberance;

a bite alert contact adjacent said clutch assembly for engagement with said first protuberance;

a calibration member adjacent said clutch assembly for engagement with said second protuberance;

wherein said calibration member provides a selectable amount of resistance to rotation of said clutch assembly, thereby regulating an amount of rotational force required to activate said bite alert contact;

said calibration member has a first end for engaging said second protuberance of said clutch assembly, said calibration member has a second end upon which is mounted a sensitivity spring; and further comprising a sensitivity switch accessible by a user for selectively engaging said sensitivity spring for altering a resistance to rotation of said clutch assembly by said calibration member.

8. The adjustable sensitivity bite alert for a fishing reel according to claim 7 wherein:

said sensitivity switch may be set to engage or not to engage said sensitivity spring.

9. The adjustable sensitivity bite alert for a fishing reel according to claim 7 wherein:

said sensitivity switch engages a sensitivity switch retainer that forces said switch into one of a first and a second position.

\* \* \* \* \*